United States Patent [19]
Lestradet

[11] Patent Number: 4,558,760
[45] Date of Patent: Dec. 17, 1985

[54] APPARATUS FOR AUTOMATICALLY GUIDING THE MOVEMENT OF A VEHICLE, ESPECIALLY AN OFF-ROAD VEHICLE

[75] Inventor: Denis Lestradet, Fere Champenoise, France

[73] Assignee: Preciculture, France

[21] Appl. No.: 459,348

[22] Filed: Jan. 20, 1983

[30] Foreign Application Priority Data

Jan. 22, 1982 [FR] France .................. 82 00995

[51] Int. Cl.⁴ .............................................. B62D 1/00
[52] U.S. Cl. ..................... 180/169; 56/10.2; 172/3; 172/26
[58] Field of Search ........... 180/167, 168, 169; 172/3, 4.5, 23, 26; 56/10.2; 343/464; 364/443, 444, 424, 448, 450, 436, 449; 356/1, 4, 141, 152; 340/24, 27 NA, 52 R

[56] References Cited

U.S. PATENT DOCUMENTS

| 2,674,332 | 4/1954 | Ovshinsky | 172/3 |
| 3,715,572 | 2/1973 | Bennett | 180/169 |
| 4,225,226 | 9/1980 | Davidson | 364/449 |
| 4,231,093 | 10/1980 | LaVance | 364/443 |

FOREIGN PATENT DOCUMENTS

| 2305771 | 10/1976 | France . | |
| 2333303 | 6/1977 | France . | |
| 2447842 | 8/1980 | France . | |
| 1485180 | 9/1977 | United Kingdom . | |
| 2012992 | 8/1979 | United Kingdom | 172/3 |
| 2098361 | 11/1982 | United Kingdom | 172/3 |

Primary Examiner—Joseph F. Peters, Jr.
Assistant Examiner—Joseph G. McCarthy
Attorney, Agent, or Firm—Andrus, Sceales, Starke & Sawall

[57] ABSTRACT

The apparatus is of the kind comprising detectors (21,23) of deviation of vehicle positional parameters from a path which is fixed in advance providing electrical data which actuates a control device (14) connected to a steering device (7) for steering the steered wheels (2) of the vehicle. The problem to be solved is to avoid the influence of shocks and vibrations and reduce the interventions of the driver. To this end, the detectors comprise a travelled distance detector (21) and a detector (23) of the steered angle of a steered wheel that provide data to a comparator (28) which is also connected to a memory (30) storing positional data relating to a path to be followed, including a manually set device (43) for introducing the desired spacing between parallel passes.

The invention is especially applicable to agricultural machines.

12 Claims, 5 Drawing Figures

APPARATUS FOR AUTOMATICALLY GUIDING THE MOVEMENT OF A VEHICLE, ESPECIALLY AN OFF-ROAD VEHICLE

BACKGROUND OF THE INVENTION

The present invention relates to apparatus for automatically guiding the movement of a vehicle, especially an off-road vehicle, such as an agricultural machine, of the kind including means for detecting deviation of the vehicle position relative to a path fixed in advance, comprising at least one transducer for detecting an instantaneous positional parameter and providing electrical detected position data, and steering control means responsive to the detected position signal for controlling steering means coupled to the steered wheels of the vehicle.

DESCRIPTION OF THE PRIOR ART

The present applicant's French patent application No. 81 04550, for example, discloses an apparatus of this kind in which the path fixed in advance which the vehicle is to follow is a straight line on the ground whose direction is materialized by the direction of a magnetised member, which is mounted rotatably and floating, and therefore seeks the magnetic North, relative to its support, the directional deviation detection being provided by the cooperation of limited reflecting angular areas on the magnetised member with an opto-electric device which provides an electrical direction deviation signal to the control means for steering the wheels.

Such known apparatus, using for example a navigational compass with an analogue output was intended to provide a very precise response by using the optical amplification of the deviation of the moving part of the magnetised member, the analogue output given by the opto-electric device being able to supply the steering servo-control. However, such a structure was formed as a large and heavy assembly which was badly suited to the vibrations of the motor and the inevitable shocks during start up, the amplitudes and frequencies of shocks due to the nature of the terrains which are by definition very diverse and practically impossible to foresee. All of this made it extremely difficult to obtain accurate control data. Moreover, the compass had to be installed on a support which itself could be turned relative to the vehicle to enable the initial setting of the direction of the axis of the tractor so as to adapt the track of the first pass to the edge of the land, for example a field to be covered. It would also have needed a brake between the compass and the orientable support to ensure regular maintenance of the initial angular setting all the way along each of the straight line passes, the brake further increasing the size and cost of the apparatus.

It should also be noted that guidance apparatus of the kind referred to should enable the vehicle to follow several successive parallel passes on the ground, outwards and return, so that it should, if possible, help the driver to perform at the end of each pass a "u"-turn corresponding very exactly to a change of direction of 180° so that it is then lined up properly at the start of a new parallel pass to be done.

Thus, the object of the present invention is to provide apparatus of the kind referred to and which avoids the disadvantages mentioned above and which especially is less sensitive to the vibrations and shocks to which the vehicle on which it is fitted is normally subjected and which is also compact and less expensive.

SUMMARY OF THE INVENTION

The present invention provides an apparatus for automatically guiding the movement of a vehicle comprising desired path means for producing desired path data defining positional parameters of a path to be followed, detector means responsive to at least one instantaneous positional parameter of the vehicle for producing detected position data, comparison means responsive to said desired path data and said detected position data for producing a deviation signal relating to deviation of the vehicle from said desired path, and steering control means responsive to said deviation signal for controlling the vehicle steering, to bring said vehicle towards said desired path, wherein said detector means is responsive to a distance travelled by the vehicle and to the steering angle of a steered wheel to provide electrical signals defining said detected position data, said desired path means comprising memory means for storing electrical signals defining said desired path data including manually set data relating to the desired spacing between successive passes, said comparison means comprising calculating and regulating means responsive to said electrical signals.

Due to this arrangement, the comparison means compares at each moment the detected position data with the desired path data and actuates the steering control means to tend to keep the vehicle on the desired path. Thus the data processing may be purely electrical and static and relatively insensitive to shocks and vibrations, and moreover the apparatus may be relatively compact, occupying little space and being readily placed inside the vehicle, and also relatively inexpensive, since it may be assembled from commercially available components.

Firstly, one obtains the capability to maintain a fixed heading. Experience shows that on a long and often uneven pass maintaining a fixed heading implies constant and progressive correction as soon as the vehicle departs from the desired heading, as the vehicle, especially an agricultural machine such as tractor fitted with instruments for working the soil or treating plants, is subject to yawing from time to time due for example to a wheel dropping into a furrow or hitting a large stone, or to driving on muddy ground. It is clear that it is particularly important in the case of an agricultural tractor, among others, to maintain the machine on the desired so as to avoid encroaching on the previous pass which could have serious consequences, for example if a spray device is towed behind the tractor in which case that could give rise to overlapping and burning of the plants which have had a doubled treatment or in the case of the opposite deviation total absence of treatment in the resulting gap.

DESCRIPTION OF THE DRAWINGS

Other features and advantages of the invention will appear from the following description, given by way of example with reference to the accompanying drawings, in which.

DESCRIPTION OF THE EMBODIMENTS

Figure 1:
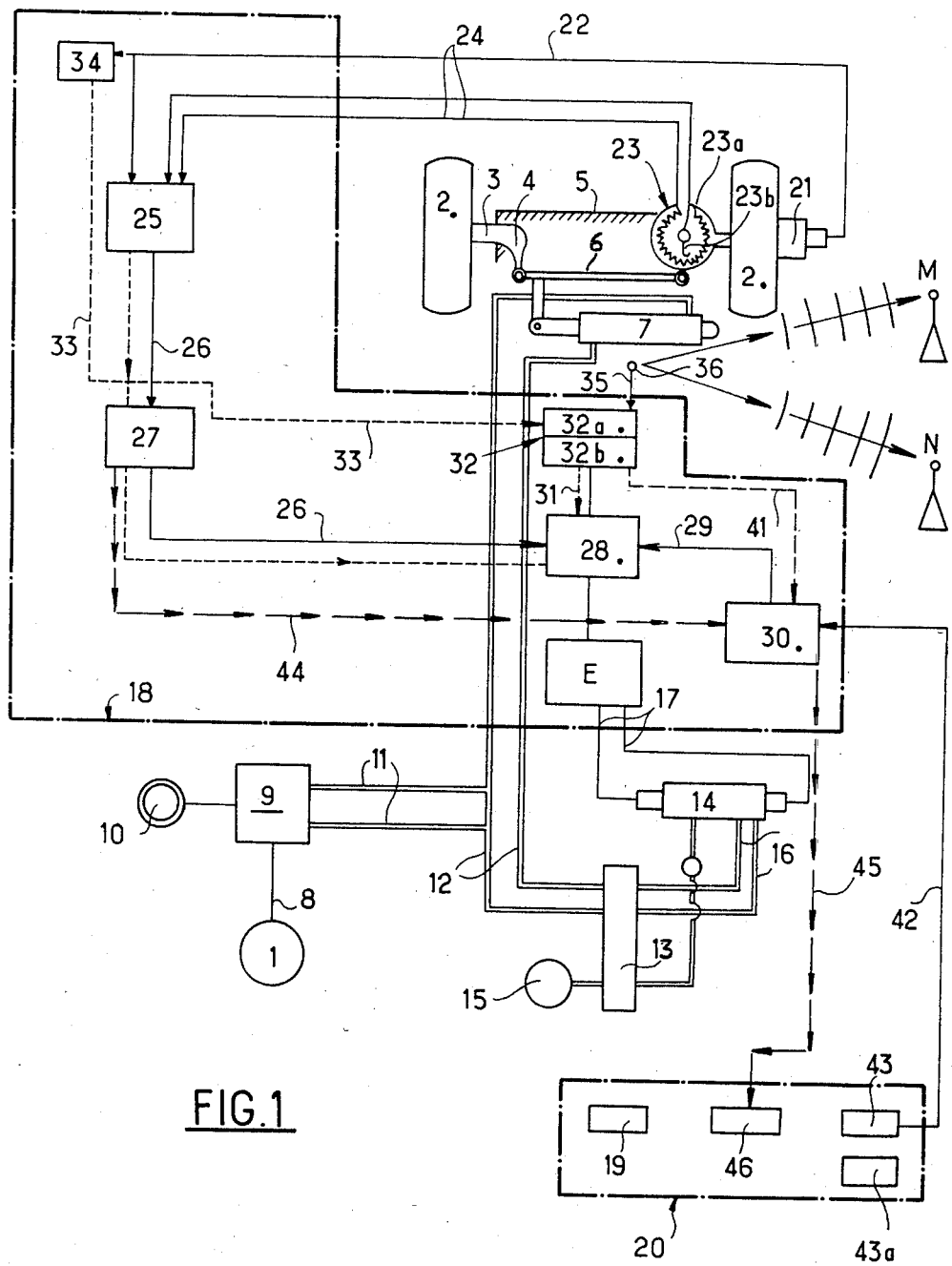
FIG. 1 is a general diagrammatic view of guidance apparatus in accordance with a particular embodiment of the invention.
Figure 3:
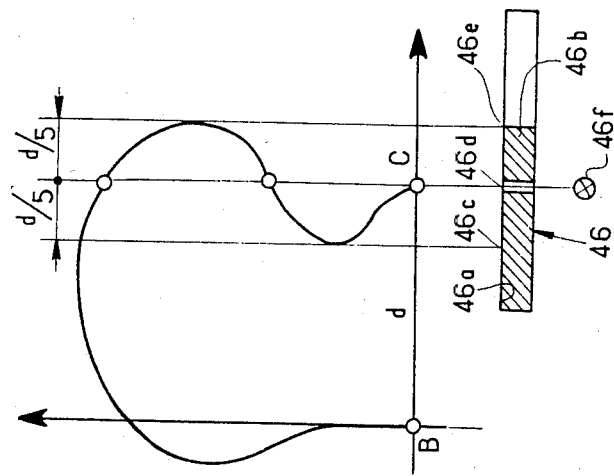
FIG. 3 is a view illustrating a particular operational phase of this apparatus and showing the path taken to "recentre" onto a straight line.

The guidance apparatus illustrated is designed to be fitted on an agricultural vehicle, such as a tractor fitted with one or more instruments for working the ground or treating plants, and of which only the steering wheel 1 and one pair of steerable wheels 2 are shown. The steerable wheels are coupled by a steering mechanism comprising on one hand for each wheel, an angle steering arm 3 whose angle 4 is mounted pivotingly on the chassis 5 of the tractor and on the other hand, a transverse track link rod 6 which is movable solidly with the piston rod of a piston-and-cylinder control device 7 of which the cylinder is mounted on the chassis 5.

The steering column 8 controlled by the steering wheel 1 cooperates with a distributor valve of the "orbital" type 9 which is supplied by a source 10 and whose two pipes 11 are connected through a control valve 13 (in a first "manual" position) to two pipes leading to the two cylinder chambers of the device 7, the valve 13 also being able (in a second "automatic" position) to put a servo-valve 14 in communication with its own hydraulic source 15, and two control pipes 16 of the same servo-valve 14 in communication with the steering control pipes 12; the two electric control inputs 17 of the servo-valve are also connected to a calculation and regulation apparatus 18 disposed behind the vehicle dash-board, and a knob for a switch 19 controlling the valve ("manual" and "automatic" positions) is disposed on the dash-board 20 itself adjacent the steering wheel 1.

The guidance apparatus also comprises a "distance travelled" detector comprising a speed transducer 21 which is more particularly made in the form of an optoelectrical encoder disposed on the chassis 5 of the vehicle adjacent the hub of one of steerable wheels 2 and which produces at its output 22 a value comprising a train of electrical pulses with one pulse per unit of distance travelled (the unit being chosen for example as one pulse per 25 cm); the apparatus also comprises a steerable wheel direction detector comprising a rotary potentiometer 23 whose axis is disposed at the pivot axis 4 of the steering arm 3 associated with the same steerable wheel 2 and whose resistance 23a is for example solid with the chassis 5 and its wiper 23b is solid with the steering arm 3, the potentiometer being connected between two current lines 24 and supplying an output analogue value consisting of an electrical voltage, the two lines 24 and the output 22 of the encoder being connected to the calculation and regulation apparatus 18.

The calculation and regulation apparatus 18 comprises a detected coordinate calculator 25 whose three inputs receive the output 22 from the encoder 21 and the two lines 24 of the potentiometer 23, while its own output is connected by a line 26 to supply the detected coordinates for permanent position checking through a memory 27 for storing the detected coordinates to a first input of a comparator 28. The comparator 28 has two other inputs of which one is connected by a line 29 to receive theoretical coordinates for permanent position checking from an output of a second memory 30 comprising a device for storing and accessing theoretical coordinates, and the other input is connected by a line 31 to receive theoretical coordinates for intermittent position control from a second theoretical coordinate calculator 32. The calculator 32 comprises two stages 32a and 32b connected together, the first stage 32a having two inputs one of which is connected by a trigger line 33 to the output of a trigger counter 34, whose input is connected to the output 22 of the encoder, and the other of which is connected by an intermittent control line 35 to a wave transmitter receiver 36 which is mounted on the chassis 5 of the vehicle.

Figure 2:
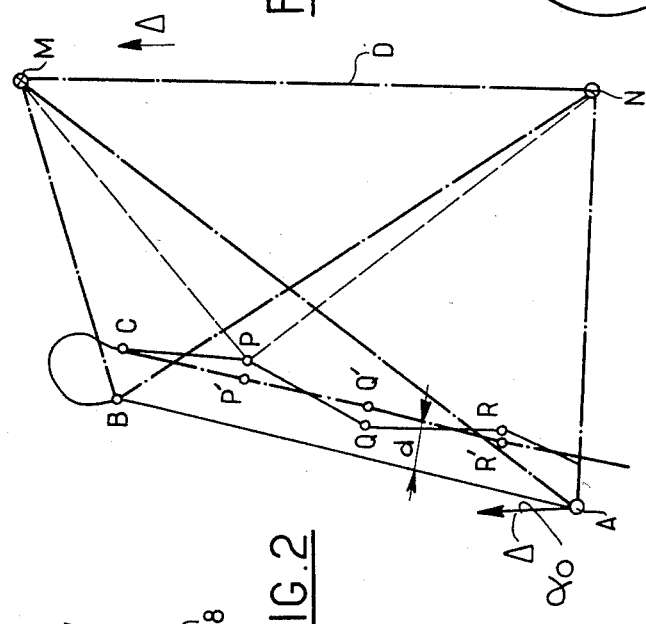
FIG. 2 of a view illustrating an example of multiple outward and return traces produced using this apparatus.
Figure 4:
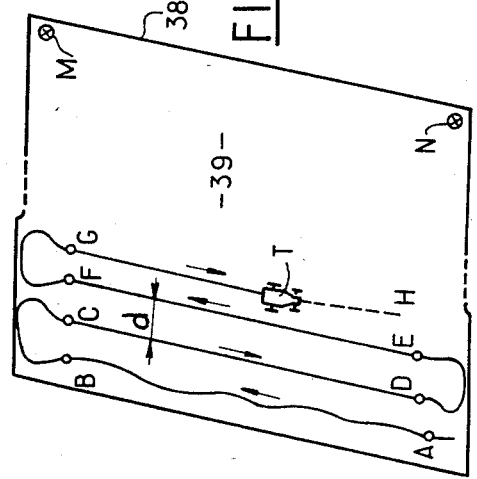
FIG. 4 is a similar view illustrating another operational phase, corresponding to a "u"-return between two straight line tracks.

The transmitter-receiver 36 is tuned to a given frequency and cooperates with wave reception and reflection beacons M and N which are fixed at the two ends of one side 38 of a field 39, as shown in FIG. 2, that the tractor equipped with the apparatus described herein is to cover.

Figure 5:
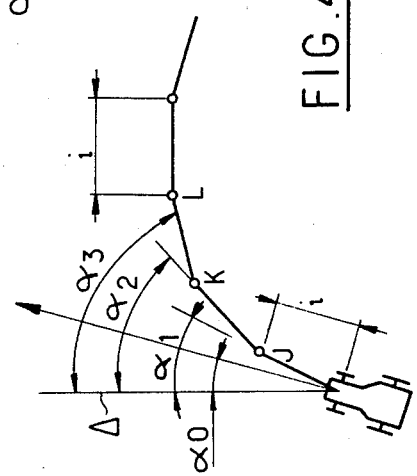
FIG. 5 is a view illustrating the performance of such a "u"-turn, in relation to the display device for such a "u"-turn.

The first stage 32a of the calculator 32 comprises a stage for intermittently checking the distances of the vehicle from the beacons while its second stage 32b comprises a calculation stage for the actual instantaneous position of the vehicle relative to the beacons, the two outputs of this stage being connected respectively by the intermittent control line 31 to the comparator 28, and by a line 41 for supplying actual coordinates memorising an initial path to a first input of the memory 30. A second input of the memory 30 is connected by a line 42 to a device 43 for inputting the desired value of the distance to be maintained between successive parallel passes of the vehicle, the device being disposed on the dash-board 20 and comprising for example an encoder wheel, keyboard or equivalent device, while the third input of the same memory 30 is connected directly to the output of the memory 27 by a line 44 for supplying "U-turn" detected coordinates. A second output of the memory 30 is connected by a line 45 to a display device 46 for the end of U-turn coincidence, which is disposed on the dash-board 20 and which, as shown in more detail in FIG. 5, comprises a window 46a having a set of electroluminescent diodes presenting a rod strip 46b which extends from the left end of the window as far as a certain position which, is a function of the voltage supplied to the device on the line 45, determining the number of diodes illuminated, the position to which the strip extends being to the left (46c), on (46d) or to the right (46e) of a mid-position at which is also disposed a track intersection lamp 46f beneath the mid line 46d.

The operation of the apparatus described above is as follows, and is split into three main parts, namely: automatic memorisation of the initial pass, parallel copying of this pass entirely automatically, and manual U-turn with automatic guidance.

For automatic memorisation of the initial pass, the agricultural vehicle T is placed at one end A of the side 47 of the field opposite to the side 38 on which the beacons M and N are placed, the field being assumed to have regular straight edges and thus forming a quadrilateral. The driver puts the switch 19 in the "manual" position so that the steering wheel controls the power steering 7 directly and he then drives the tractor along an initial path AB which follows the edge 47 of the field, with small lateral deviations relative to the theoretical straight line AB. All along this pass and at each point the transmitter-receiver 36, cooperating with the beacons M and N, enables the calculator to calculate the sum of the distances MT+TN, the distance D between the beacons M and N being known and entered into the memory 30, for example by means of another encoder wheel 43a, and to calculate the coordinates of the position of the tractor relative to the two beacons taken as a reference base line. The coordinates calculated at each point are then subjected by the same calculator 32 to an arithmetic averaging which enables the calculator to produce and store, through the line 41, the slope $\alpha_0$ of the initial pass AB relative to the direction $\Delta$ of the base line MN. The same memory 30 receives from the line 42 the desired value d spacing successive outward and return passes which is inputted by the driver using the encoder wheel 43.

When this initial operating phase is completed, the tractor has arrived at the point B and the driver leaves the switch 19 in the "manual" position. It should be noted that when the tractor has arrived for example at the point B, with its steerable wheels 2 directed substantially straight ahead along the line AB, the cursor of the potentiometer is set either by the driver, using an initial pre-setting member (not shown), or directly by calculation of the mean of the values registered along the pass AB, the setting being such that no voltage appears between the two lines 24 or that the value of the voltage which exists is balanced exactly at the comparator 28 by the voltage coming from the calculator 30 and corresponding to the value $\alpha_0$ of the slope of the initial pass.

Although a U-turn must be performed so that the tractor arrives at the start C of a new straight line CD to be followed, such a U-turn will only be described laterherein, the third phase of the operation which consists of copying the initial pass along the line CD forms an element which is absolutely indispensable and preponderant to the guidance forming the subject of this embodiment of the present invention.

At the point C, the tractor is normally pointed in a direction exactly parallel to the initial line AB and the switch 19 is passed to the "automatic" position in a way which is described below, so that the power steering device 7 is controlled by the servo-valve 14 and consequently by the calculation and regulation device 18. In the absence of intermittent re-centering, which is described below, the potentiometer 23 supplies continuously and all along the pass CD an analogue voltage value which corresponds to the angle of the steerable wheels 2 relative to the chassis 5 and therefore to the deviation that these wheels may make relative to the initial angle $\alpha_0$ of the direction of the tractor at the point C, that is to say the mean value registered during the initial pass AB, this base value $\alpha_0$ being kept in the memory 30 as indicated above. The comparator 28 can therefore proceed continuously to a comparison of the theoretical value to be followed $\alpha_0$ and the value which is detected continuously, supplied respectively by the lines 26 and 29, the output of the comparator being an analogue value which is directly a function of the difference observed and which, through a control stage 48 actuates the servo-valve 14, which in turn displaces the power steering device 7 and the wheels 2 in such a direction as to tend to cancel the observed difference. It is important to note that the servo-control of the steering is actuated continuously all the way along the pass CD but that on the other hand it is achieved using detected direction values, that is to say values which may correspond imprecisely to the desired position of the tractor because of various phenomena, such as slipping of the wheels on the ground which happens when the wheels undergo "side-slip" on soaked ground or on a slope, that is to say sliding sideways while maintaining the same direction. It will also be noted that during this copying phase, the calculator 25 can be inactive, in principle, and so can the memory 27, to the extent that the comparator 28 only makes a simple comparison of a value $\alpha$ detected by the potentiometer 23. In this type of operation, that is to say apart from re-centering, the encoder 21 is not in fact active, and it merely supplies a train of pulses, for example at a rate of 1 pulse per 25 cm, which thus constitutes the equivalent of a time base.

However, onto this permanent operation preformed all the way along the pass CD is superposed intermittently a temporary operation of "directional re-centering" which enables compensation to be made for transverse deviations due to the slip mentioned above among other factors. This operation is brought into action for example at regular intervals insisting of a multiple of the unit of distance travelled corresponding to a pulse from the encoder, for example every 30 m which corresponds to the appearance of 120 successive pulses from the encoder. It is the counter 34 which is pre-set to this value (120 in the example) and which is triggered at the end of the interval considered to send an output pulse on the line 33 towards the calculator 32 and simultaneously, to the comparator 28 by the lines 26 and through the memory 27. This latter pulse at the comparator 28 controls a circuit for cancelling the comparator which temporarily blocks its input 29 coming from the memory 30 and simultaneously gives the priority to the line 31 coming from the calculator 32. This temporary operation is indicated in FIG. 1 by showing the relevant lines as dotted lines, whereas the permanent servo-control operation described above is indicated by full lines, and the initial memorising operation described at the beginning is shown in broken lines (direct connection calculator 32 to memory 30).

Following the triggering produced by the pulse coming from the counter 34, this pulse forming an order to the transmitter-receiver 36 to check the position, the transmitter-receiver then measures the actual position of the tractor T which is then at a point P (distance CP=30 m), according to the trigonometrical triangulation principle already indicated above. The calculator 32 then processes the data supplied by the transmitter-receiver to calculate the real instantaneous coordinates of the position P of the tractor relative to the beacons M and N taken as reference system, these coordinates being called "real" in the sense that they take account of the slip, phenomena referred to. In addition, the values actually detected by the encoder 21 and the potentiometer, which values do not take account of the slip, are processed by the calculator 25, which thus acts here due, for example, for unblocking of an inhibit circuit by a trigger pulse also coming from the counter 34 so that the calculator responds to these two values as well as the initial slope value $\alpha_0$ and the distance between lines d to calculate the coordinates of the point P' of the line CD where the tractor ought to be if there had not been any slip.

The latter coordinates of the point P' are then compared, in the comparator 28 with the "real" coordinates of the point P formed by the other calculator 32, and the output of the comparator then actuates the steering control servo-valve 14, producing re-centering relative to the theoretical axis of the line CD which corresponds to a theoretical section CP'. The tractor will then describe a new section PQ along which a fresh servo-control will occur, again only taking account of the steering angle x, the intermittent checking circuit formed by the transmitter-receiver 36 having again become inactive. Only when the new path section PQ has been completed will the intermittent checking circuit again be brought into action by the counter 34. It should be noted that the duration of the intermittent checking circuit's operation lasts an extremely short period relative to the duration of the displacement along a section CP or PQ.

By way of a variant, for example if it is desired to use a transmitter-receiver whose precision is lower, and which is therefore less expensive, it can be envisaged to cause several successive checks, for example about ten in number, which are made one immediately after the other and as close as possible one to the others so as to be considered as performed practically at the same point, these multiple checks enabling the calculator 32 to take an arithmetic mean of the different coordinate values thus obtained and which are statistically different, the number of checks being sufficient so that the mean improves significantly the precision of the measurement. It is important to note that such a series of checks is made, for example in a period of the order of 1/1000th of a second, therefore in a distance of the order of a millimeter which is quite incommensurable with the length of the distance of a section of path between checks (30 m).

The guidance of the tractor on each of the successive straight line passes CP, EF, GH etc. ... will be performed in an absolutely identical manner, with a permanent steering servo-control not taking account of slip and with intermittent re-centering which does take account of slip and which only causes the transmitter-receiver to operate during extremely short periods of time.

Each of the U-turns which must join up the straight-line passes is performed in the following way.

At the point B and indeed at each start of a U-turn: D, F, H, etc. ... , the driver puts the switch 19 in the "manual" position so that the servo-value 14 is put out of the circuit and it is the steering wheel which controls the power steering device 7 directly. This means that the driver can follow any path which suits him to drive to the finish point C of the U-turn and which particularly enables him to chose the most favourable portions of terrain or on the contrary to avoid obstacles such as large stones or tree stumps or trunks. Right from the start B of the U-turn, switching over to "manual" brings the memory 27 into action, for example by means of a trigger circuit connected to the switch, so as to memorize the instantaneous coordinates of the tractor at this starting position in the memory 27 which was previously empty, thus forming a new reference base for the U-turn movement. It is to be understood that at the starting point B of the U-turn, the direction of the tractor has a value $a_0$ which was that of the initial straight line AB, as stored in the memory 30.

Progressively, as the tractor moves under the driver's control, the encoder 21 emits regular spaced pulses corresponding to the 25 cm spaces on the ground and at the end of each interval is an interrogation order is sent to the potentiometer 23 which provides the value of the new direction of the tractor $a_1$, $a_2$, $a_3$, etc. ... At each of these successive points J, K, L etc. ..., the calculator 25 calculates the new coordinates of the tractor relative to the base coordinates of the point B, utilizing the successive values supplied by the encoder and the potentiometer. Simultaneously and successively these new coordinates are stored in the memory 27. The same coordinates are simultaneously sent to the comparator 28 which also receives from the memory 30 the coordinates of the new straight line CD to connect up with, these coordinates having previously been memorized and coming from the initial calculation made by the calculator 32 when the initial pass AB was measured by the transmitter-receiver and taking account of the distance d to be observed between lines, introduced by the driver using the wheel encoder 43, which distance is 35 m, for example. The comparison is made permanently until the tractor has lined up with the new straight line. As soon as the path of the tractor intersects a band overlapping the line CD and having a width of d/5 for example on each side of the line, the comparator 28 controls the memory 30, which receives the detected coordinates coming from the memory by a line 45 indicated by arrows, to actuate the display device 46 whose red strip 46b moves on one side and the other of the midposition 46d as long as the tractor moves alternately to the right or left of the alignment CD. The alternate movement is of course controlled by the driver acting on the steering wheel 1 and whose attention is drawn by the display device as soon as the tractor has intersected for the first time the band referred to and the red strip has started to move from the left edge of the window 46a towards the mid-line 46d. Each time the tractor intersects the alignment CD, the lamp 46f lights up and goes out immediately and stays permanently lit while the tractor is simultaneously on the alignment CD and heading exactly in the desired direction due to the damping of the hunting movement that he has given to the tractor around this alignment. Simultaneously a trigger circuit switches the switch 19 to the "automatic" position so that the next straight line (CD, EF etc.) is followed in the manner indicated above.

The above operation concerns the special case, usually the most widespread in usage where the initial pass to be copied is a straight line, for example the ease of covering a field with straight edges. Mention should be made of another possibility in the case of usage for an initial pass to be copied which is a curve. In this case, the first operating phase, which concerns the memorizing of the initial pass is not limited to simple calculation of the slope of a straight line as in the previous case, but is extended to complete measurement of the coordinates of the initial curve to be recopied, all the way along it. This measurement is obtained continuously using values which are detected by the encoder 21 and the potentiometer 23 and which the calculator 25 transforms into coordinates relative to the origin A of the curved path, these coordinates being successingly stored in the memory 27 which in this case is made active, as it is during the execution of a U-turn as described above. An essential advantage in these cases of extension of application of the guidance apparatus is that no special modification of the apparatus is needed and no major element has to be added to the apparatus. This continuous memorizing of the coordinates of the path followed, which is required in the case of following a U-turn or a curved initial pass, can also be done, optionally, when following a straight initial pass. It should be remembered however that while a path CD or EF etc. ... is being followed, the initial coordinates of each section CP', P'Q', Q'R' etc. at the end of which a re-centering is performed, are stored in the same memory 27 and that, as soon as the correction corresponding to the re-centering has been performed, at P', Q', R' etc. ..., this memory 27 is emptied and take in store the new initial coordinates of the next sector which are those of P', Q', R' etc. ...

As for the arrangement of the transmitter-receiver on the tractor and the beacons on the ground, it will be noted that the arrangement can be inverted, but the described arrangement is the more favourable to the extent that the transmitter-receiver must be fed with electric current, and such a supply is already available on the tractor. Also it is well known that it is by measuring the time elapsing between transmission of a wave and receiving the wave reflected by a beacon that the transmitter-receiver gives the value of the distance separating it from this beacon.

A particularly simplified and inexpensive embodiment of the calculation and regulation device 18 will be obtained by using a micro-processor which advantageously essentially comprises a servo-control printed circuit or electronic card processing all the relevant data.

It is also important to stress that the encoder 21 and the potentiometer should always both be on the same steered wheel so that their data will be coherent, and also that the particular wheel should if possible not be a driven or driving wheel so as to avoid the uncontrollable influence which the slip phenomena of a driving wheel would otherwise have on the guidance control. Because the encoder and potentiometer are arranged on the same wheel disposed laterally relative to the axis of the tractor, it is suitable for the control to take account both of angular differences which appear between the two wheels during turning (Jeanteau geometry) and of a correction to the distance travelled, which must be made to one of the coordinates calculated (x) and which is different depending on whether the turn is to the left or to the right; the first correction mentioned depends on the structure and dimensions of the tractor and the corresponding data must be supplied by the driver of the tractor, while the second correction is a direct function of the value of the front track-width of the tractor.

It is also worth recalling that the servo-valve used here can be considered as a distributor whose flow rate can however be controlled; indeed, unlike a normal distributor which stays stable at the chosen distribution and gives a flow as a function of the characteristics of the pump which feeds it, in the case of a servo-valve the flow rate is always equal to or less than that of the pump and therefore gives the possibility of modulating the flow rate to a desired value.

Two last remarks concerning the facts that most of the components used are common to the two distinct operating phases of U-turn and straight line, so that the overall investment is not doubled but on the contrary is reduced to a strict minimum and that the driver is freed to the maximum from any initiative and requirement for particular skill, which facilitates following subsidiary operations; moreover, the guidance apparatus must in all cases observe the two constraints which consist in the necessity for perfect angular positioning at the start of each straight line pass, and the elimination of any slip, other than angular, of the wheels on the ground.

I claim:

1. Apparatus for automatically guiding the movement of a vehicle having at least one steerable wheel comprising:

desired path means for producing desired path data defining positionable parameters of a desired path to be followed by the vehicle, said means including memory means for storing signals defining said desired path data, including operator established data relating to the desired spacing between successive passes of the vehicle;

detector means having opto-electric pulse generating means coupled to said wheel for detecting the distance traveled by the vehicle and potentiometer means coupled to said wheel and responsive to the movement of same for detecting the steering angle of the steered wheel, said detector means providing signals defining detected position data;

comparison means comprising computing and regulating means responsive to said desired path data and said detected position data for producing a deviation signal relating to deviation of the vehicle from said desired path; and steering control means responsive to said deviation signal for controlling the vehicle steering to bring said vehicle toward said desired path.

2. Apparatus as claimed in claim 1, wherein said desired path means is responsive to detected position data relating to parameters of an initial pass to be copied, said detector means comprising vehicle position means responsive to vehicle ground position parameters of at least the initial pass.

3. Apparatus as claimed in claim 2, wherein said vehicle position means comprises transmitter-receiver means and at least two beacon means for reflecting wave transmissions from said transmitter-receiver means back thereto, whereby to enable positional triangulation of the vehicle relative to the ground to provide detected position data.

4. Apparatus as claimed in claim 3, wherein said beacon means are disposed on the ground, said initial pass being disposed with at most a small angle relative to a line joining said beacon means.

5. Apparatus as claimed in claim 2, wherein said vehicle position means is responsive to positional parameters relating to first and second points on said initial pass thereby defining the direction of a straight line substantially corresponding thereto, said desired path means defining positional parameters relating to said direction of a straight line.

6. Apparatus as claimed in claim 2, wherein said vehicle position means is responsive to positional parameters relating to a plurality of points on said initial pass and said desired path means being responsive thereto to calculate and store coordinate data relating to said points.

7. Apparatus as claimed in claim 2, wherein said vehicle position means is responsive to positional parameters of a plurality of passes, said calculating and regulating means of said comparison means being intermittently responsive to said distance and steering angle signals and to said vehicle ground position parameters.

8. Apparatus as claimed in claim 1, wherein said calculating and regulating means is responsive to said distance travelled to define its intermittent response.

9. Apparatus as claimed in claim 1 wherein said calculating and regulating means of said comparison means includes coordinate means responsive to said distance and steering angle signals produced by said detector means for calculating detected position data in terms of positional coordinates of the vehicle.

10. Apparatus as claimed in claim 9, wherein said coordinate means is responsive to continuous series of said detected position data corresponding to successive positions of the vehicle as it moves.

11. Apparatus as claimed in claim 1, wherein said vehicle includes manually operable means for disabling said apparatus whereby the vehicle may be manually steered.

12. Apparatus as claimed in claim 1 including display means responsive to said memory means for displaying information relating to a deviation of the vehicle from a subsequently desired vehicle path.

* * * * *